United States Patent [19]
Dichtel

[11] Patent Number: 5,636,408
[45] Date of Patent: Jun. 10, 1997

[54] FLOOR MAT RETAINER CLIP

[76] Inventor: Ronald J. Dichtel, 618 Brookwood La. East, Rochester Hills, Mich. 48309

[21] Appl. No.: 179,443

[22] Filed: Jan. 10, 1994

[51] Int. Cl.⁶ ............................................. A47G 27/04
[52] U.S. Cl. ..................... 16/6; 24/295; 24/354; 24/377
[58] Field of Search ..................... 16/4, 6, 8, 17; 24/295, 354, 355, 369, 377, 380, 458

[56] References Cited

U.S. PATENT DOCUMENTS

| | | | |
|---|---|---|---|
| 1,196,087 | 8/1916 | Crume | 24/458 |
| 2,137,652 | 8/1938 | Lundberg et al. | 24/458 |
| 3,981,050 | 9/1976 | Dauphinais | 24/354 |
| 4,860,402 | 8/1989 | Dichtel | 16/4 |
| 5,095,592 | 3/1992 | Doerfling | 24/295 |
| 5,186,517 | 2/1993 | Gilmore et al. | 24/295 |

FOREIGN PATENT DOCUMENTS 1126218  11/1956  France ............................. 24/295

Primary Examiner—M. Rachuba
Assistant Examiner—Kenneth J. Hansen
Attorney, Agent, or Firm—VanOphem Meehan & VanOphem

[57] ABSTRACT

A clip configured to secure a floor mat to the interior floor of an automobile. The clip includes a recess in which a peripheral edge of the floor mat is captured, and a lip which engages an aperture provided in the floor mat. The clip is able to accommodate a wide variety of floor mats in a manner that essentially eliminates the potential for the floor mat to shift on the floor of the automobile, substantially without regard to the thickness of the floor mat. In an alternate embodiment, the clip is anchored to the interior floor of the automobile in the same manner but is provided with a post member which is adapted to be secured within an aperture provided in the floor mat. In addition, extensive flexing and bending of the clip is not necessary to secure the floor mat, such that the clip is capable of repeated use. The structure and manufacture of the clip is uncomplicated, such that the clip is relatively inexpensive to manufacture.

26 Claims, 2 Drawing Sheets

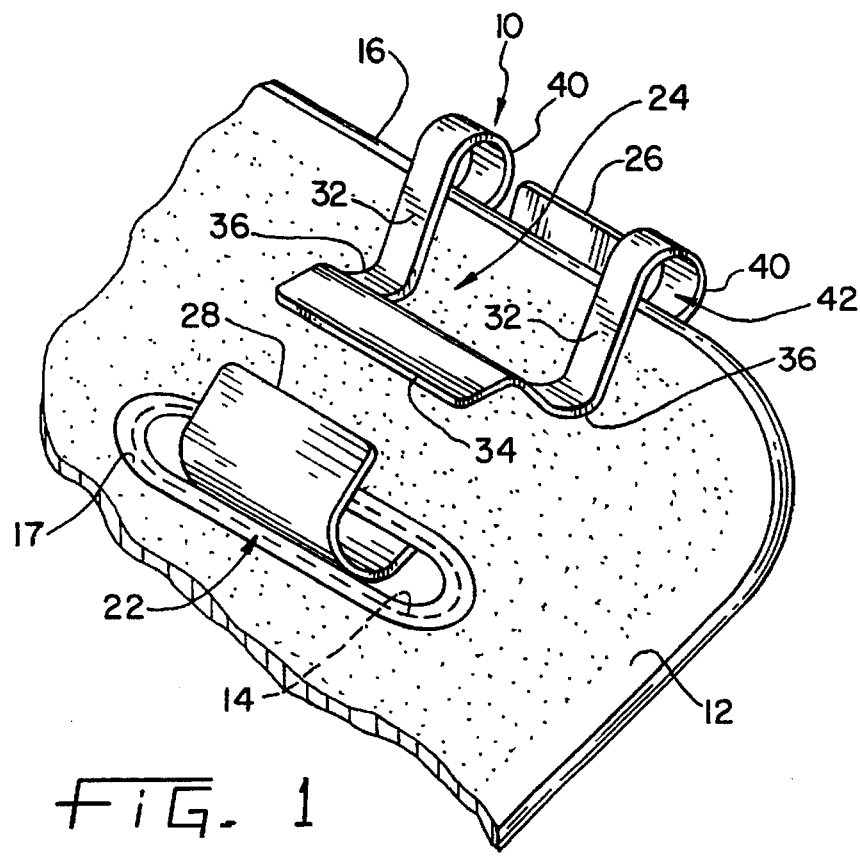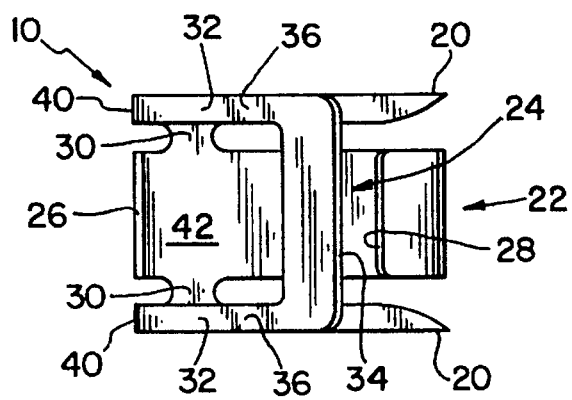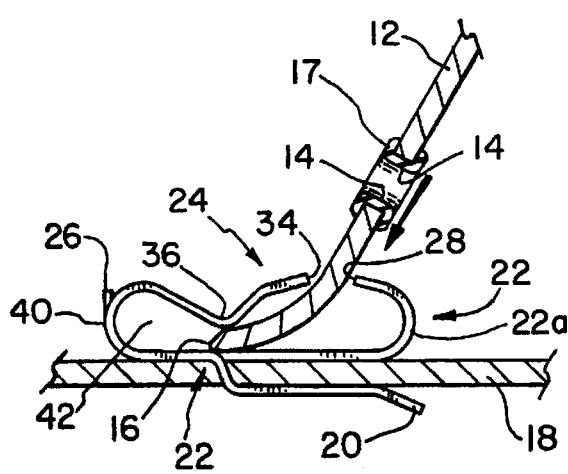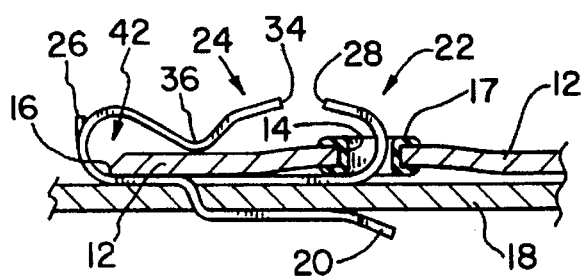

FLOOR MAT RETAINER CLIP

BACKGROUND OF THE INVENTION

1. Field of the Invention

The present invention generally relates to retainer clips for maintaining a mat or rug stationary relative to an underlying floor. More specifically, this invention relates to a one-piece retainer clip which is adapted to secure a mat, such as a floor mat of an automobile, while engaging an aperture formed in the mat so as to secure the mat relative to an underlying carpet, such as the interior carpet of the automobile.

2. Description of the Prior Art

Automobiles are conventionally provided with interior carpeting for aesthetic appearances, as well as comfort for the passengers. Because the carpet is immediately exposed to whatever soil, chemicals or debris that are present on the shoes or feet of the automobile's passengers, automobile carpeting is highly susceptible to staining and wear. In addition, the carpet below the accelerator pedal is particularly prone to wear in that the driver's foot operating the accelerator will generally rest at substantially the identical position each time the driver operates the automobile.

As a result, floor mats are widely used in automobiles to protect the carpet at locations where the feet of the driver and passengers are normally placed while seated. Floor mats are typically formed from a polymeric material to which carpeting fabric may or may not be attached on an upper surface thereof. Use of floor mats in an automobile permits a majority of the soil tracked into the automobile to be removed by lifting the floor mats out of the automobile so that they may be individually cleaned. Once a floor mat has become soiled or worn to the point that it becomes unsightly, the floor mat can be replaced with a new floor mat, such that an appealing appearance to the automobile is maintained at minimal cost.

However, a floor mat is capable of protecting the underlying carpet of an automobile only to the extent that the floor mat remains in place over the most heavily used areas of the carpet. Often, the floor mat becomes displaced from its intended location as passengers enter and leave the automobile, such that the underlying carpet becomes exposed. As a result, to prevent soiling and wear of the underlying carpet, one must continuously check to ensure that the floor mats of the automobile are properly placed before entering the interior of the automobile, which is a nuisance and typically impractical to practice on a regular basis.

Accordingly, various types of carpet clips have been suggested in the prior art to secure a floor mat to the floor of an automobile so as to maintain the floor mat substantially stationary relative to the underlying carpet. A particularly notable example of such a clip is disclosed in U.S. Pat. No. 4,860,402 to Dichtel. The clip taught by Dichtel is generally a one-piece U-shaped member which is stamped from a relatively thin resilient material, such as a spring steel. In use, the U-shaped member is laid on its side, such that an upper leg is disposed above a lower leg. The recess formed between the two legs serves to receive a peripheral edge of the floor mat. Teeth extend downwardly from the upper leg and engage the upper surface of the floor mat, so as to retain the peripheral edge of the floor mat within the recess. The upper and lower legs are biased toward each other by the base of the clip's U-shape so as to ensure that the teeth remain engaged with the floor mat. Projecting from the lower leg are a pair of prongs which are used to anchor the clip to the underlying carpet by being forcibly inserted into the carpet.

The clip taught by Dichtel performs its intended function well, in that the clip requires minimal space when attached to the floor mat, such that the clip can be readily used within the small confines of an automobile interior. In addition, the clip is generally uncomplicated, and can be readily manufactured by conventional stamping and bending operations. However, the ability of the teeth to satisfactorily engage the upper surface of the floor mat depends in part on the thickness of the floor mat, as well as the material from which the upper surface of the floor mat is made. Consequently, the clip may not be suitable for every type and style of floor mat commercially available in the market. For example, a floor mat composed only of a thin sheet of plastic will generally not be sufficiently secured with the clip to prevent its movement relative to the underlying carpet. If the above circumstances exist, the clip taught by Dichtel will be unable to secure the mat in place and thus prevent the wear and soiling of the underlying carpet, as intended.

In addition, release of the floor mat from the clip requires that the upper leg be bent upwards so as to disengage the teeth from the floor mat. As a result, there is the potential for the clip to eventually break from repeated use or, under extreme circumstances, the clip could be plastically deformed so as to render the clip useless after a single installation.

From the above discussion it can be readily appreciated that the prior art does not disclose a clip for use in securing a floor mat to the floor of an automobile, wherein the clip is suitably adapted to accommodate a wide variety of floor mats, in terms of their thickness and materials, such that floor mats of various styles and materials will be reliably secured to the floor of the automobile so as to provide protection to the underlying carpet.

Accordingly, what is needed is a relatively inexpensive floor mat clip which is configured to accommodate a wide variety of floor mats, wherein the clip can be readily and repeatedly installed to reliably secure the floor mat to an automobile's underlying interior carpet so as to protect the underlying carpet from wear and soiling.

SUMMARY OF THE INVENTION

According to the present invention there is provided a clip which is configured to secure a floor mat to the interior floor of an automobile. The clip is able to accommodate a wide variety of floor mats in a manner that essentially eliminates the potential for the floor mat to shift on the floor of the automobile, substantially without regard to the thickness of the floor mat. The clip does not rely upon teeth to grasp the floor mat, but an aperture in the carpeting which is retained by a projection of the clip. The clip can be readily formed from a one-piece stamping, such that the clip is structurally uncomplicated and can be readily manufactured using conventional stamping and bending operations. As a result, the clip of this invention is relatively inexpensive to manufacture.

The clip, in its preferred embodiment, includes a recess feature formed in its upper surface for receiving a peripheral edge of the floor mat, and a projection disposed laterally adjacent the recess feature for engaging an aperture formed in the floor mat. The clip is also constructed so as to impose a clamping load on the peripheral edge of the floor mat, so as to impede its escape from the recess feature. Furthermore, the clip includes an anchor by which the clip is secured to the underlying carpet, so as to prohibit the clip from being displaced relative to the carpet.

More specifically, the clip's recess feature is formed by upper and lower portions of the clip. The projection which serves to engage the aperture formed in the floor mat is preferably an upwardly extending segment of the lower portion of the clip. Access to the recess feature is through a slot formed between the upper portion and an upper edge of the projection. During installation of the floor mat, the mat's peripheral edge is first inserted through the slot and into the recess feature so as to align and engage the aperture in the floor mat with the projection formed by the lower portion of the clip. Removal of the clip requires only that the projection be disengaged from the aperture in the floor mat, so as to allow the peripheral edge of the mat to be withdrawn from the recess feature formed between the upper and lower portions of the clip. Accordingly, bending the clip in order to release the floor mat is unnecessary with the configuration taught by the present invention.

In an alternate embodiment, the clip consists of a post member formed in its lower flange which is adapted to mount in an aperture in the form of a grommet installed in the floor mat. The post is formed from resilient walls which contract upon the grommet being forced over the post and expand after the grommet has passed the widest portion so that the floor mat is securely held to the underlying carpet. More specifically, the clip of the alternate embodiment is formed from a lower member which includes a stamped post member in the form of a biased wall portion extending upwardly from the lower flange. This clip is intended to be used with a floor mat or an aperture which may be lined with a grommet. In use, the floor mat with the grommet is forced over the upstanding resilient wall member of the lower flange after the clip is in place on the carpet whereby the resiliency of the upstanding wall member allows the aperture and the floor mat to travel over the contracted portions of the wall member and come to rest against the lower flange of the clip. After the opening in the carpet is slid past the resilient portion of the upstanding wall member and the elastic deformation is relieved, the wall member expands outwardly to maintain the mat securely against the underlying carpet.

The clip of this invention can be readily manufactured by forming a substantially planar member from a suitably strong and resilient material, stamping the planar member to form the individual elements which perform the various tasks noted above, and then bending the planar member over and onto itself to impart a generally U-shaped configuration to the clip.

According to a preferred aspect of this invention, the above structure described for the clip enables the clip to accommodate a wide variety of floor mat thicknesses and styles, such that practically any available floor mat can be suitably secured to its underlying carpet. The only essential precondition for using the clip of this invention is the presence of an aperture in the floor mat. However, a suitable aperture can be formed by cutting a narrow slot in the floor mat adjacent and generally parallel to a peripheral edge of the floor mat. Such a slot can be readily formed so as to be inconspicuous, particularly when the floor mat is covered with a fabric or other carpeting material.

In addition, because the effectiveness of the clip relies on capturing a portion of the floor mat bounded by a peripheral edge of the mat and a slot or aperture formed in the mat, it is unnecessary to rely on a set of teeth to engage the upper surface of the floor mat for purposes of securing the mat to the floor of an automobile. Accordingly, the clip is readily able to physically capture the mat so as to prevent its movement relative to the underlying carpet. Removal of the clip is also uncomplicated, allowing the clip to be repeatedly used without fatiguing and ultimately fracturing the clip.

In addition, a significant advantage of the present invention is that the clip is a one-piece article and uncomplicated in its construction and use. Accordingly, the clip is relatively inexpensive to manufacture and install, each of which are highly advantageous attributes for a product intended for use in the automotive industry.

Accordingly, it is an object of the present invention to provide a clip for securing a protective mat to the carpet of an automobile.

It is a further object of the invention that the clip be structurally uncomplicated, such that a minimal number of manufacturing processes are required to fabricate the clip.

It is still a further object of the invention that the clip be configured to capture a portion of the mat between a peripheral edge thereof and a slot or aperture formed in the mat adjacent the peripheral edge.

It is yet a further object of the invention that the clip be configured in the form of a resilient post member such that a slot or aperture formed in the floor mat is forced over the resilient post member such that the floor mat is retained to the underlying carpet.

It is another object of the invention that the clip be capable of being repeatedly used without being excessively fatigued or fractured.

It is yet another object of the invention that the clip be manufacturable by a method consisting primarily of stamping and bending operations.

Other objects and advantages of this invention will be more apparent after a reading of the following detailed description taken in conjunction with the drawings provided.

BRIEF DESCRIPTION OF THE DRAWINGS

FIG. 1 is a perspective view of a clip installed on a floor mat in accordance with a preferred embodiment of this invention;

FIG. 2 is a top view of the clip of FIG. 1;

FIGS. 3 and 4 are side views illustrating the process by which the clip is installed on the floor mat so as to acquire the appearance of that shown in FIG. 1;

DETAILED DESCRIPTION OF THE PREFERRED EMBODIMENT

Figure 5:
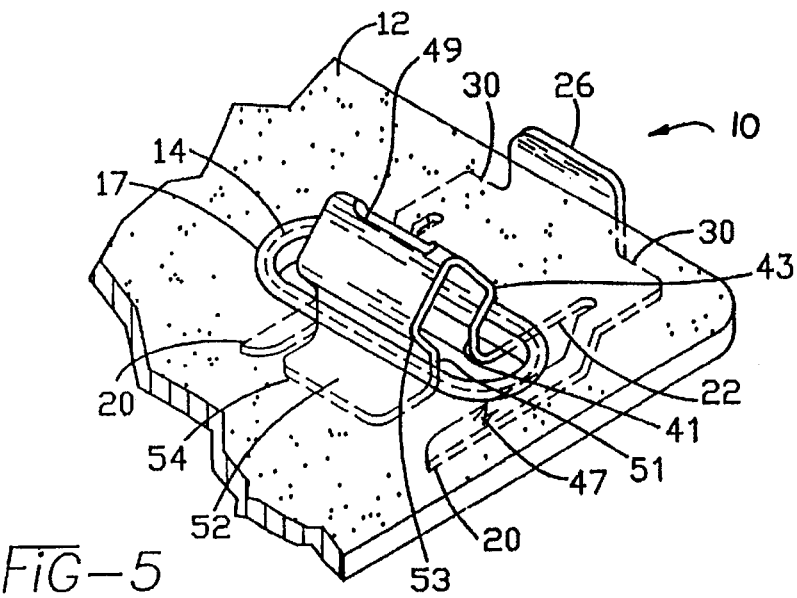
FIG. 5 is a perspective view of an alternative embodiment showing a clip without a recess and having an alternative post member, installed on a floor mat.

With reference to FIGS. 1 through 4, there is shown a clip 10 in accordance with a preferred embodiment of this invention. As illustrated, the clip 10 serves to capture an edge 16 of a floor mat 12 for the purpose of securing the floor mat 12 through an opening or aperture 14 of a grommet 17 to an underlying surface, such as carpeting 18 installed in the passenger compartment of an automobile. The clip 10 is generally a one-piece stamping which is formed through a bending operation to form receiving means having a recess 42 in which the edge of the floor mat 12 is received, and engaging means having an upwardly extending projection 22a which serves to engage the aperture 14 of the grommet 17 located in the floor mat 12, so as to capture the edge 16 within the recess 42 formed by the clip 10. As a result, the clip 10 is able to be secured to the floor mat 12 without requiring excessive deflection or bending of the clip 10, and is able to accommodate a wide variety of floor mats 12 in terms of thickness and construction.

With reference to FIGS. 1 through 4, the clip 10 of the preferred embodiment is generally a U-shaped stamped article composed of a lower flange 22 and an upper flange 24 which form the legs of the clip's augmented U-shape. Together, the lower and upper flanges 22 and 24, respectively, define the recess 42 therebetween. The lower and upper flanges 22 and 24 are resiliently interconnected through biasing portions 40 which urge the upper flange 24 toward the lower flange 22. As a result, the lower and upper flanges 22 and 24 can be resiliently spread apart so as to increase the size of the recess 42 formed therebetween, yet when released will resume their original relative positions.

Access to the recess 42 is provided by a slot formed between an upper lip 28 of the lower flange 22 and an opposing lip 34 of the upper flange 24. The lip 34 of the upper flange 24 is interconnected with the biasing portions 40 through a pair of side members 32, each of which has a protrusion 36 which further defines the recess 42. The protrusions 36 serve to resiliently engage the upper surface of the floor mat 12 once installed within the recess 42 so as to assist in immobilizing the floor mat 12 relative to the clip 10.

The lower flange 22 is arcuately formed such that the upper lip 28 extends toward the lip 34 of the upper flange 24. Consequently, the upper lip 28 serves to inhibit the unintentional release of the floor mat 12 from the recess 42, if the floor mat 12 is lifted upward. The lower flange 22 is interconnected with the biasing portions 40 through a pair of interconnecting portions 30, which further contribute to the resilient nature of the clip 10. Disposed intermediate the biasing portions 40 is a ledge 26 which is formed on the lower flange 22. The ledge 26 serves to assist in the installation of the clip 10 into the automobile's carpeting, as will be described in greater detail below.

The clip 10 further embodies anchoring means which includes a pair of prongs 20 which are interconnected with the biasing portions 40 and with the lower flange 22 through the interconnecting portions 30. The prongs 20 are displaced below the lower flange 22 and extend substantially parallel to the lower flange 22, terminating with a downward projecting piercing point. As seen in FIGS. 3 and 4, the prongs 20 serve to anchor the clip 10 into the underlying carpet 18 to which the floor mat 12 is to be secured with the clip 10.

Figure 6:
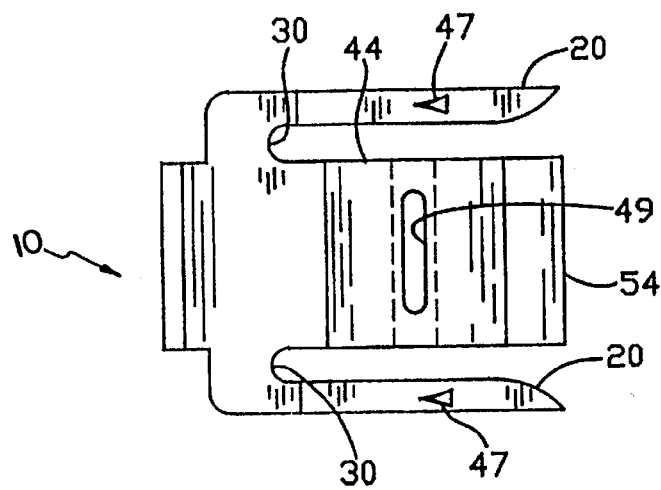
FIG. 6 is a top view of the clip of FIG. 5.
Figure 7:
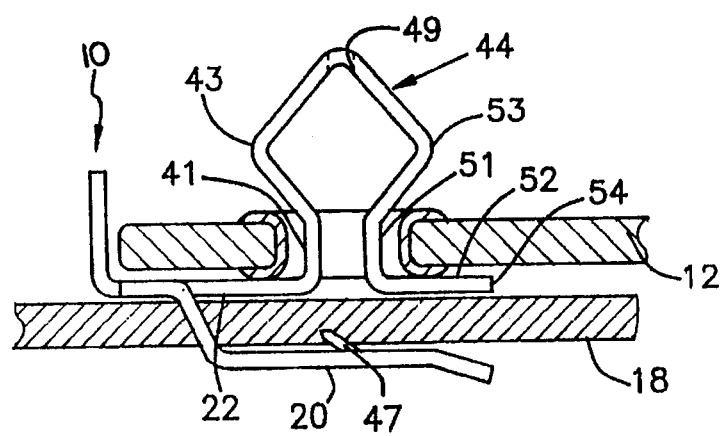
FIG. 7 is a side view illustrating the floor mat installed on the clip shown in FIG. 5.

In FIGS. 5 through 7, there is shown an alternate embodiment of the clip of the present invention. The clip 10 in the alternate embodiment has a more pronounced lower flange member 22 as compared to the preferred embodiment. In the alternate embodiment of FIGS. 5 through 7, the upper flange 24 is eliminated in that the retention is accomplished with a modified lower flange as described hereinafter.

Like the preferred embodiment, the clip 10 of the alternate embodiment has a pair of prongs 20 which interconnect with the ledge 26 and are attached to the lower flange 22 via the interconnecting portions 30. Each of the prongs 20 is provided with a barb 47 in the form of a punched out V-shaped portion which terminates into a point. The tip of the "V" is directed toward the ledge 26 and bent at an angle from the prong 20 in order to help the clip 10 to resist being pulled out from the automobile's carpet 18.

The lower flange 22 is formed into a post member 44 which is adapted to receive the aperture 14 of the grommet 17 located in an aperture of the floor mat 12. The post member 44 is formed from a first lower wall 41 which extends upwardly into a first expanded portion 43 which inclines outwardly and inwardly to the apex of the post member 44 and then angles back down into a second expanded portion 53 complementary to the first expanded portion 43. The second expanded portion 53 leads into a second lower wall portion 51 oppositely disposed to the first lower wall 41 and terminates into an integral planar portion 52 coplanar with the lower flange 22 and having an end 54.

The post member 44 has a relief aperture 49 which is essentially a slot cut in the top thereof. The top of the post member 44 is narrowed to a point. From its narrow top, the post member 44 becomes wider in the area of the first and second expanded portions 43 and 53 near the mid portion of the post member 44 and then narrows again in the area of the first and second lower wall portions 41 and 51. The widened middle portions of the post member 44 are provided to retain the floor mat 12 on the post member 44. The aperture 14 of the grommet 17 located in an aperture of the floor mat 12 and the overall width between the first and second expanded portions 43 and 53 are sized relative to each other such that the first and second expanded portions 43 and 53 resiliently deform when the grommeted aperture in the floor mat is forced over the first and second expanded portions 43 and 53 so that the first and second expanded portions 43 and 53 regain their original position to retain the floor mat 12 to the retainer clip 10.

Thus, the first and second expanded portions 43 and 53 are resiliently moved together to allow the aperture of the floor mat 12 and the associated grommet 17 to pass over the compressible post member 44 and then drop down to a position next to the first and second wall portions 41 and 51 of the post member 44 to be retained thereon. Once the grommeted aperture of the floor mat 12 is retained by the first and second expanded portions 43 and 53 of the post member 44 and the edge 16 of the floor mat 12 is juxtaposed the ledge 26 of the biasing portion 40, the floor mat 12 is securely mounted to the retainer clip.

The post member 44 of the present embodiment is primarily adapted to work with a grommeted aperture in a floor mat 12 substantially in the shape of an oval, that is, the aperture has at least one width dimension relatively greater than the rest of its width dimensions. However, it will be apparent to those skilled in the art that other configurations are possible. For example, the post member 44 may be substantially circular in cross-sectional shape and therefore adapted to work with a grommeted aperture which is substantially circular in shape.

The above configurations for the clip 10 can be achieved by stamping a metal blank, and then bending the resulting stamped article to correspond to the embodiments shown in the Figures and described herein. Most preferably, the material for the blank is a resilient metal, such as a spring steel, so as to promote the strength, resilience and life of the clip 10, though it is foreseeable that other metals could be used. However, material selection should be guided by the strength required of the clip 10 when being inserted into the underlying carpet 18 of the automobile. More specifically, the clip 10 is installed by engaging the tips of the prongs 20 in the carpet 18, and then forcing the prongs 20 beneath the carpet 18 by applying a force to the ledge 26 formed on the lower flange 22. Because the majority of the applied force will be absorbed by the interconnecting portions 30 and the prongs 20, it is imperative that the material from which the clip 10 is made be sufficiently strong to prevent plastic or permanent deformation of the prongs 20 and interconnecting portions 30 during installation.

Furthermore, due to the corrosive environment in which the clip 10 is to be used, it may be preferable to coat the clip 10 with a suitable corrosion inhibiting treatment or material. Such a coating may also be used to impart an aesthetically pleasing appearance to the clip 10, to the extent that the clip 10 can be seen once installed. Alternatively, the clip 10 could be molded from a suitable polymeric material in a manner well known in the art. While such materials are generally insusceptible to corrosion, material selection again must be made in view of the structural strength required of the clip 10.

FIGS. 3 and 4 illustrate the manner in which the floor mat 12 is secured to the clip 10, of the preferred embodiment, after the clip 10 has been anchored to the carpet 18 with the prongs 20. Likewise FIG. 7 illustrates the manner in which the floor mat 12 is secured to the clip 10 of the alternate embodiment after the clip 10 has been anchored to the carpet 18 with the prongs 20. Generally, the preferred location of the floor mat 12 on the underlying carpet 18 within the automobile's passenger compartment is first determined. As is apparent from FIGS. 1 and 5, the clip 10 is preferably attached at the perimeter of the floor mat 12. Accordingly, the clip 10 is positioned inside the perimeter of the floor mat 12 as determined by the desired location of the floor mat 12 on the underlying carpet 18. At least two clips 10 are preferably used at opposite corners at one end of the floor mat 12, though it is foreseeable that a single clip 10 could be used, as well as one clip 10 at each corner of the floor mat 12.

To be compatible with the clip 10 of this invention, the floor mat 12 must be provided with a suitable opening which is adjacent and substantially parallel to the edge 16 of the floor mat 12, such as the aperture 14 shown in FIGS. 1, 3, 4, 5 and 7. Though illustrated as a uniform oval-shaped opening that has been specially provided in the floor mat 12, the aperture 14 may also be a slot or hole which has been formed or cut in the floor mat 12 after its manufacture. For example, a suitable aperture 14 can be formed by cutting a narrow slot or hole in the floor mat. 12 adjacent and generally parallel to the edge 16 of the floor mat 12. Such a slot can be readily formed so as to be inconspicuous, particularly if the floor mat 12 is covered with a fabric or other conventional carpeting material. Otherwise, the floor mat 12 can be manufactured with a narrow slot or the aperture 14 shown. With any of the above approaches, the basic criterion is that the aperture 14 have a width sufficient to receive the upwardly extending portion 22a of the lower flange 22 of the preferred embodiment, as illustrated in FIG. 1, or the post member 44 of the alternate embodiment, as illustrated in FIG. 5.

The next step in the installation of the floor mat 12 of the preferred embodiment is to insert the peripheral edge 16 of the floor mat 12 into the recess 42 formed between the lower and upper flanges 22 and 24. In so doing, the edge 16 must be forced between the protrusions 36 and the lower flange 22, which resiliently expand to accommodate the floor mat 12. The clamping force generated by the forced expansion of the lower and upper flanges 22 and 24 via the biasing portions 40 serves to substantially immobilize the edge 16 within the recess 42. However, the degree to which the lower and upper flanges 22 and 24 are deflected relative to each other is generally moderate, even when used with a relatively thick floor mat 12.

Insertion of the floor mat 12 into the recess 42 continues until the aperture 14 formed in the floor mat 12 is aligned with the upper lip 28 of the lower flange 22, so as to enable the lower flange 22 to be inserted through the aperture 14. Once accomplished, the edge 16 of the floor mat 12 must be slightly retracted through the recess 42 so as to permit the aperture 14 to follow the arcuate contour of the lower flange 22 below the upper lip 28. As the aperture 14 follows the contour of the lower flange 22, the floor mat 12 is aligned to be parallel to the general orientation of the clip 10 and the surface of the carpet 18, as shown in FIG. 4.

Once installation is complete, the edge 16 of the floor mat 12 remains captured between the protrusions 36 and the lower flange 22. Disengagement of the lower flange 22 from the aperture 14 is discouraged by the friction generated between the protrusions 36 and the lower flange 22, which impedes movement of the floor mat 12 relative to the clip 10. As a result, the floor mat 12 is prevented from being displaced relative to the clip 10 an amount necessary for the aperture 14 to clear the upper lip 28 of the lower flange 22. Removal of the floor mat 12 from the clip 10 requires only that the lower flange 22 be disengaged from the aperture 14 in the floor mat 12, so as to allow withdrawal of the edge 16 of the floor mat 12 from the recess 42. Generally, bending the clip 10 in order to release the floor mat 12 is typically unnecessary with the configuration taught by the present invention, such that the potential for repeated use of the clip 10 is improved.

In the alternate embodiment shown in FIGS. 5 through 7, the installation of the floor mat 12 onto the post member 44 is very simple. Once the clip 10 of the alternate embodiment is in place on the carpet 18, the aperture 14 of the floor mat 12 is aligned over the post member 44 and is then pushed slowly over the first and second expanded portions 43 and 53. The resiliency of the first and second expanded portions 43 and 53 allows the aperture in the floor mat to travel over the contracted expanded portions and come to rest against the lower flange 22 of the clip. After the grommet 17 and the aperture 14 are slid past the first and second expanded portions 43 and 53 and the elastic deformation is relieved, the first and second expanded portions 43 and 53 secure the mat to the clip.

As a result of the structure described above, the clip 10 is able to secure the floor mat 12 to the underlying carpet 18 of the automobile, such that the floor mat 12 remains properly positioned on the carpet 18 so as to prevent excess wear and soiling of the carpet 18. Furthermore, the clip 10 is inconspicuous, with the exposed regions of the clip 10 lacking any sharp edges or teeth which might otherwise cause injury to a passenger or damage to his or her clothing or footwear.

From the above, it can be seen that a significant advantage of the present invention is that the clip 10 is able to accommodate floor mats 12 having a wide variety of thicknesses and styles, such that practically any available floor mat can be suitably accommodated. The only essential precondition for using the clip 10 of this invention is the presence of an aperture 14 in the floor mat 12. However, a suitable aperture can be formed by cutting a narrow slot or hole in the floor mat 12 adjacent and generally parallel to a peripheral edge 16 of the floor mat 12. Such a slot can be readily formed so as to be inconspicuous, particularly when the floor mat 12 is covered with a fabric or other carpeting material.

In addition, because the effectiveness of the clip 10 relies on capturing a portion of the floor mat 12 between the edge 16 of the floor mat 12 and the aperture 14 formed adjacent the edge 16, it is unnecessary to rely on a set of teeth to engage the upper surface of the floor mat 12 for purposes of securing the floor mat 12 to the clip 10. Accordingly, the clip 10 is more capable of physically capturing the floor mat 12 so as to prevent its movement relative to the underlying carpet 18 to which the floor mat 12 is to be secured. Removal of the clip 10 is also relatively uncomplicated, and can be accomplished without significantly bending the lower and upper flanges 22 and 24 of the preferred embodiment, such that the clip 10 can be repeatedly used without being prone to fatigue or fracture.

In addition, a significant advantage of the present invention is that the clip 10 is a one-piece stamped article having an uncomplicated structure. Accordingly, the clip 10 is relatively inexpensive to manufacture and install, each of which are highly advantageous attributes for a product intended for use in the automotive industry. Furthermore, with minimal modifications the advantages of the clip 10 of this invention can be realized when used to secure mats or rugs in various other applications, automotive and otherwise.

While the invention has been described in terms of a preferred embodiment, it is apparent that other forms could be adopted by one skilled in the art. For example, the size and shape of the lower and upper flanges 22 and 24 could be altered from that shown in the drawings, some of the structural interrelationships of the individual elements of the clip 10 could be altered, and the clip 10 could be adapted for use in an application other than securing the floor mat for an automobile. Accordingly, the scope of the invention is to be limited only by the following claims.

What is claimed is:

1. A clip in combination with a mat having at least one aperture located therein for retaining said mat substantially stationary relative to an underlying carpet, said clip comprising:

means formed in an upper surface of said clip for receiving said peripheral edge of said mat;

means disposed on a lower portion of said clip and laterally adjacent said receiving means for engaging said aperture of said mat; and means interconnected with said receiving means for anchoring said clip to said underlying carpet;

wherein said peripheral edge of said mat is juxtaposed said receiving means so as to align and engage said at least one aperture of said mat with said engaging means.

2. The clip in combination with the mat of claim 1 further comprising:

means spaced relative to said receiving means for generating a clamping load on said mat.

3. The clip in combination with the mat of claim 2 wherein said receiving means comprises:

an upper portion of said clip;

an upper edge of said engaging means; and a slot formed between said upper portion of said clip and said upper edge of said engaging means.

4. The clip in combination with the mat of claim 2 wherein said engaging means comprises an upwardly extending lower portion of said receiving means.

5. The clip in combination with the mat of claim 2 wherein said generating means comprises a resilient U-shaped member interconnecting said receiving means and said engaging means.

6. The clip in combination with the mat of claim 2 wherein said generating means comprises a downwardly extending portion of said receiving means.

7. The clip in combination with the mat of claim 2 wherein said anchoring means comprises means for piercing said underlying carpet.

8. The clip in combination with the mat of claim 2 wherein said clip is a one-piece stamped article.

9. The clip in combination with the mat of claim 1 wherein said engaging means has a first portion having a width and a second portion connected to said first portion, said second portion having a width relatively larger than said width of said first portion of said engaging means, said width of said second portion being larger than a width of said at least one aperture of said mat, said width of said at least one aperture of said mat being less than said predetermined width of said first portion of said engaging means.

10. The clip in combination with the mat of claim 9 wherein said anchoring means further comprises means for preventing said piercing means from being withdrawn from said underlying carpet.

11. The clip in combination with the mat of claim 1 wherein said anchoring means comprises means for piercing said underlying carpet.

12. The clip in combination with the mat of claim 1 wherein said clip is a one-piece stamped article.

13. A clip in combination with a mat having at least one aperture located therein adjacent a peripheral edge thereof for retaining said mat substantially stationary relative to an underlying carpet, said clip comprising:

a main body having a substantially U-shaped configuration, said main body having an upper portion, a lower portion having an edge which extends upwardly toward said upper portion, and means for biasing said upper portion toward said lower portion, said edge of said lower portion being sized to be received through said aperture in said mat;

means defined by said upper and lower portions for receiving said peripheral edge of said mat therebetween; and an anchor portion interconnected to said main body, said anchor portion having piercing means for securing said clip to said underlying carpet;

whereby said peripheral edge of said mat is received in said receiving means so as to be received between said upper and lower portions and such that said aperture of said mat is aligned and engaged with said lower portion.

14. The clip in combination with the mat of claim 13 wherein said receiving means comprises:

said upper portion of said clip;

said edge of said lower portion; and a slot formed between said upper portion of said clip and said edge of said lower portion.

15. The clip in combination with the mat of claim 13 wherein said lower portion arcuately projects upwardly so as to terminate with said edge.

16. The clip in combination with the mat of claim 13 wherein said upper portion comprises a downwardly extending portion for engaging said peripheral edge of said mat.

17. The clip in combination with the mat of claim 13 wherein said piercing means is resiliently interconnected with said lower portion.

18. The clip in combination with the mat of claim 13 wherein said clip is a one-piece stamped article.

19. The clip in combination with the mat of claim 13 further comprising means interconnected with said anchor portion for forcibly inserting said piercing means into said underlying carpet.

20. A clip in combination with a mat having at least one aperture located therein adjacent a peripheral edge thereof for retaining said mat substantially stationary relative to an underlying carpet, said clip comprising:

an upper portion;

a lower portion disposed adjacent said upper portion, said lower portion having an edge which arcuately extends upwardly toward said upper portion so as to form a slot therewith, said edge being sized to be received in said aperture in said mat, said upper and lower portions defining a recess for receiving said peripheral edge of said mat;

a substantially U-shaped biasing portion interconnecting said upper portion and said lower portion, said biasing portion biasing said upper portion toward said lower portion so as to engage said peripheral edge of said mat when disposed within said recess defined by said upper and lower portions; and an anchor portion resiliently interconnected to said biasing portion, said anchor portion having a plurality of piercing members for securing said clip to said underlying carpet;

whereby said peripheral edge of said mat is received in said recess defined by said upper and lower portions so as to be received between said upper and lower portions, and such that said aperture of said mat is aligned and engaged with said lower portion.

21. The clip in combination with the mat of claim 20 wherein said upper portion comprises a downwardly extending portion for engaging said peripheral edge of said mat.

22. The clip in combination with the mat of claim 20 wherein said anchor portion comprises a pair of piercing members resiliently projecting downwardly from said lower portion.

23. The clip in combination with the mat of claim 20 wherein said clip is a one-piece stamped article.

24. The clip in combination with the mat of claim 20 wherein said clip is formed from a resilient metal.

25. The clip in combination with the mat of claim 20 further comprising means interconnected with said anchor portion for transmitting an installation force to said plurality of piercing members, so as to facilitate forcible engagement of said underlying carpet with said plurality of piercing members.

26. The clip in combination with the mat of claim 1 wherein said engaging means comprises an upwardly extending post member interconnected with said receiving means.

* * * * *